(12) United States Patent
Li et al.

(10) Patent No.: US 9,135,309 B2
(45) Date of Patent: *Sep. 15, 2015

(54) SYSTEM AND METHOD FOR BUILDING DECISION TREES IN A DATABASE

(75) Inventors: Wei Li, San Carlos, CA (US); Shiby Thomas, Nashua, NH (US); Joseph Yarmus, Groton, MA (US); Ari W. Mozes, Lexington, MA (US); Mahesh Jagannath, Shrewsbury, MA (US)

(73) Assignee: Oracle International Corporation, Redwood Shores, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/300,030

(22) Filed: Nov. 18, 2011

(65) Prior Publication Data

US 2012/0066260 A1 Mar. 15, 2012

Related U.S. Application Data

(63) Continuation of application No. 11/344,112, filed on Feb. 1, 2006, now Pat. No. 8,065,326.

(51) Int. Cl.
*G06F 17/30* (2006.01)
(52) U.S. Cl.
CPC .................. *G06F 17/30539* (2013.01)
(58) Field of Classification Search
CPC ................................................ G06F 17/30539
USPC ......................................................... 707/776
See application file for complete search history.

(56) References Cited

U.S. PATENT DOCUMENTS

| 5,335,345 | A | 8/1994 | Frieder et al. |
| 5,787,274 | A | 7/1998 | Agrawal |
| 6,247,016 | B1 | 6/2001 | Rastogi et al. |
| 6,324,533 | B1 * | 11/2001 | Agrawal et al. ........................ 1/1 |
| 6,338,055 | B1 | 1/2002 | Hagmann et al. |
| 2005/0021482 | A1 * | 1/2005 | Kim et al. ......................... 706/11 |
| 2005/0114377 | A1 * | 5/2005 | Russell et al. ................ 707/102 |
| 2006/0218169 | A1 | 9/2006 | Steinberg et al. |

OTHER PUBLICATIONS

Data Structures and Programs Design in C++/ Robert L. Kruse, Alexander J. Ryba., Prentice-Hall, Inc., Date of Publication: Sep. 1, 1998, pp. 286-291.
Non-Final Office Action dated Dec. 10, 2007 received in U.S. Appl. No. 11/344,112.
Final Office Action dated Aug. 20, 2008 received in U.S. Appl. No. 11/344,112.
Non-Final Office Action dated Jan. 26, 2009 received in U.S. Appl. No. 11/344,112.
Final Office Action dated Aug. 13, 2009 received in U.S. Appl. No. 11/344,112.

(Continued)

*Primary Examiner* — Alexey Shmatov
(74) *Attorney, Agent, or Firm* — Hickman Palermo Becker Bingham LLP

(57) ABSTRACT

A computer-implemented method of creating a data mining model in a database management system comprises accepting a database language statement at the database management system, the database language statement indicating a dataset and a data mining model to be created from the dataset, and creating, in the database management system, the indicated data mining model using the indicated dataset, wherein creation and application of the data mining model does not require moving data to a separate data mining engine.

12 Claims, 7 Drawing Sheets

(56) References Cited

OTHER PUBLICATIONS

Non-Final Office Action dated Feb. 1, 2010 received in U.S. Appl. No. 11/344,112.

Final Office Action dated Sep. 8, 2010 received in U.S. Appl. No. 11/344,112.

Notice of Allowance dated Jul. 6, 2011 received in U.S. Appl. No. 11/344,112.

* cited by examiner

Fig. 4
| ROW 401 | AGE 1 | INCOME 297 | RESPONSE N | • • • |
| ROW 402 | AGE 2 | INCOME 427 | RESPONSE N | • • • |
| ROW 403 | AGE 3 | INCOME 215 | RESPONSE N | • • • |
| ROW 404 | AGE 1 | INCOME 330 | RESPONSE N | • • • |
| ROW 405 | AGE 5 | INCOME 694 | RESPONSE Y | • • • |
| ROW 406 | AGE 1 | INCOME 486 | RESPONSE N | • • • |
| ROW 407 | AGE 2 | INCOME 195 | RESPONSE N | • • • |
| ROW 408 | AGE 4 | INCOME 376 | RESPONSE N | • • • |
| ROW 409 | AGE 3 | INCOME 700 | RESPONSE Y | • • • |
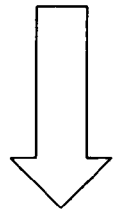
| BITMAP 450 | AGE | 1 | 100101000... |
| BITMAP 451 | AGE | 2 | 010000100... |
| BITMAP 452 | AGE | 3 | 001000001... |
| BITMAP 453 | AGE | 4 | 000000010... |
| BITMAP 454 | AGE | 5 | 000010000... |

Fig. 5

```
FUNCTION ORA_FI_DECISION_TREE_HORIZ(
        horiz_cursor      IN  SYS_REFCURSOR,
        impurity_metric   IN  VARCHAR2 DEFAULT NULL,
        term_max_depth IN  NUMBER DEFAULT NULL,
        term_minrec_split   IN  NUMBER DEFAULT NULL,
        term_minpct_split   IN  NUMBER DEFAULT NULL,
        term_minrec_node  IN  NUMBER DEFAULT NULL,
        term_minpct_node  IN  NUMBER DEFAULT NULL,
        cost_matrixIN  SYS_REFCURSOR DEFAULT NULL,
        priors             IN  SYS_REFCURSOR DEFAULT NULL
) RETURN TABLE OF ROW (
        PARENTNODE   NUMBER,
        NODE     NUMBER,
        SPLITNUMBER  NUMBER,
        SPLITVAL_SUPP   NUMBER,
        ATTRNAME      VARCHAR2(30),
        LOWVAL_MEAN NUMBER,
        HIGHVAL_DEV_SUPP  NUMBER,
        ATTRVAL_TGTVAL VARCHAR2(4000))
```

Fig. 6

```
SELECT *
FROM TABLE(ORA_FI_DECISION_TREE_HORIZ(
   CURSOR(SELECT TO_CHAR(PROMO_SUBCATEGORY),
PROMO_ID,
         PROMO_NAME, PROMO_CATEGORY, PROMO_COST
      FROM PROMOTIONS),
   'TREE_IMPURITY_GINI', 19,0,0,0,0,NULL))
```

Fig. 7

```
BEGIN
 DBMS_DATA_MINING.CREATE_MODEL(
   model_name       => 'DT_model',
   mining_function  => dbms_data_mining.classification,
   data_table_name  => 'promotions',
   case_id_column_name => null,
   target_column_name  => 'promo_subcategory',
   settings_table_name => 'DT_settings');
END;
/
```

SYSTEM AND METHOD FOR BUILDING DECISION TREES IN A DATABASE

CROSS-REFERENCE TO RELATED APPLICATIONS

This application is a continuation of U.S. patent application Ser. No. 11/344,112, filed Feb. 1, 2006, the entire contents of which are incorporated herein by reference.

BACKGROUND OF THE INVENTION

1. Field of the Invention

The present invention relates to a system, method, computer program product, for representing, and a representation of, decision trees in a relational database system.

2. Description of the Related Art

Data mining is a technique by which hidden patterns may be found in a group of data. True data mining doesn't just change the presentation of data, but actually discovers previously unknown relationships among the data. The patterns thus discovered are represented as models. Data mining is typically implemented as software in or in association with database systems. Data mining includes several major steps. First, data mining models are generated based on one or more data analysis algorithms. Initially, the models are "untrained", but are "trained" by processing training data and extracting information that defines the model. The extracted information represented as a model is then deployed for use in data mining, for example, by providing predictions of future behavior based on patterns of past behavior.

One important form of data mining model is the decision tree. Decision trees are an efficient form of representing decision processes for classifying entities into categories, or constructing piecewise constant functions in nonlinear regression. A tree functions in a hierarchical arrangement; data flowing "down" a tree encounters one decision at a time until a terminal node is reached. A particular variable enters the calculation only when it is required at a particular decision node.

Classification is a well-known and extensively researched problem in the realm of Data Mining. It has found diverse applications in areas of targeted marketing, customer segmentation, fraud detection, and medical diagnosis among others. Among the methods proposed, decision trees are popular for modeling data for classification purposes. The primary goal of classification methods is to learn the relationship between a target attribute and many predictor attributes in the data. Given instances (records) of data where the predictors and targets are known, the modeling process attempts to glean any relationships between the predictor and target attributes. Subsequently, the model is used to provide a prediction of the target attribute for data instances where the target value is unknown and some or all of the predictors are available.

Classification using decision trees is a well-known technique that has been around for a long time. However, expressing this functionality in standard Structured Query Language (SQL), the native language of the Relational Database Management System (RDBMS), is difficult, and it naturally leads to extremely inefficient execution by making use of operations that are not designed to handle this particular type of workload. In addition, current systems require the user to extract the data from the RDBMS into a data mining specific engine and then invoke decision tree algorithms. A need arises for a technique by which classification functionality using decision trees may be expressed in SQL that provides improved ease of use and implementation, as well as improved efficiency of execution.

SUMMARY OF THE INVENTION

The present invention provides the capability for classification functionality using decision trees to be expressed in SQL, and provides improved ease of use and implementation, as well as improved efficiency of execution. In addition, the present invention provides in-database execution of the decision tree functionality, eliminating the need to extract the data from the database into a data mining specific engine and then invoke decision tree algorithms.

In one embodiment of the present invention, a computer-implemented method of representing a decision tree model in relational form comprises providing a directed acyclic graph comprising a plurality of nodes and a plurality of links, each link connecting a plurality of nodes, encoding a tree structure by including in each node a parent-child relationship of the node with other nodes, encoding in each node information relating to a split represented by the node, the split information including a splitting predictor and a split value, and encoding in each node a target histogram.

In one aspect of the present invention, the method may further comprise encoding in each node surrogate split information including a surrogate splitting predictor and a split value. The method may further comprise encoding in each node cost values used for pruning the decision tree model. The method may further comprise encoding binning partitions. The method may further comprise encoding in each node an identifier of the node, an identifier of a parent node, an indicator of a split number of the split represented by the node, an indicator of a quality of the split represented by the node, an identifier of a splitting attribute, and information relating to a value of the split represented by the node. The split represented by the node may be a numerical split and the information relating to the value of the split represented by the node may comprise a high value and a low value. The split represented by the node may be a categorical split and the information relating to the value of the split represented by the node may comprise a set of categorical attribute values.

BRIEF DESCRIPTION OF THE DRAWINGS

Further features and advantages of the invention can be ascertained from the following detailed description that is provided in connection with the drawings described below:

FIG. 4 is an exemplary illustration of construction of bitmaps from rows of data.

FIG. 5 is an example of an interface defining an SQL statement that invokes in-database generation of a decision tree model.

FIG. 6 is an example of the use of an SQL statement, such as that defined in FIG. 5, which invokes in-database generation of a decision tree model.

FIG. 7 is an example of a PL/SQL API through which an SQL statement, such as that shown in FIG. 6, is invoked.

DETAILED DESCRIPTION OF THE PREFERRED EMBODIMENTS

The present invention introduces a new SQL table function that encapsulates the concept of creating a decision tree based on an input dataset that is the output from a query. This table function takes the input dataset along with some user-configurable information, and it directly produces a decision tree. The tree can then be used to understand the relationships in the data as well as to score new records.

The new table function is implemented inside the Relational Database Management System (RDBMS) by program code that supports this new SQL table function. Integrating the process of building decision trees inside the RDBMS enables leveraging of many of the database's strengths, such as memory management, parallel execution, and recursive execution. Providing a simple SQL interface via a specialized table function makes the integration of data mining into the database far simpler.

The SQL table function is an improvement over the use of standard SQL. It simplifies the query, but more importantly it simplifies the query optimization stages by making it explicit what type of operation is being processed. It enables the decision tree build process to leverage scalable, efficient, and robust database processing with a very simple interface.

Another advantage is that this method doesn't have to incur the expense, management, and security issues of moving the data to a specialized mining engine.

A decision tree is represented as a directed acyclic graph consisting of links and nodes. The structure defines a set of parent-child relationships. Parent nodes contain splitting rules that define the conditions under which a specific child is chosen. The rules consist of a splitting predictor, an operator, and one or more split values. For example, a rule might be IF AGE<=10 THEN Left Child ELSE Right Child. Another example is IF HAIR Color IN (Brown, Black) THEN Left Child ELSE Right Child. In addition, each node can contain ancillary information, such as a target value histogram, count of instances in the node, preferred target value at the node, or a ranked list of target values at the node.

Figure 1:
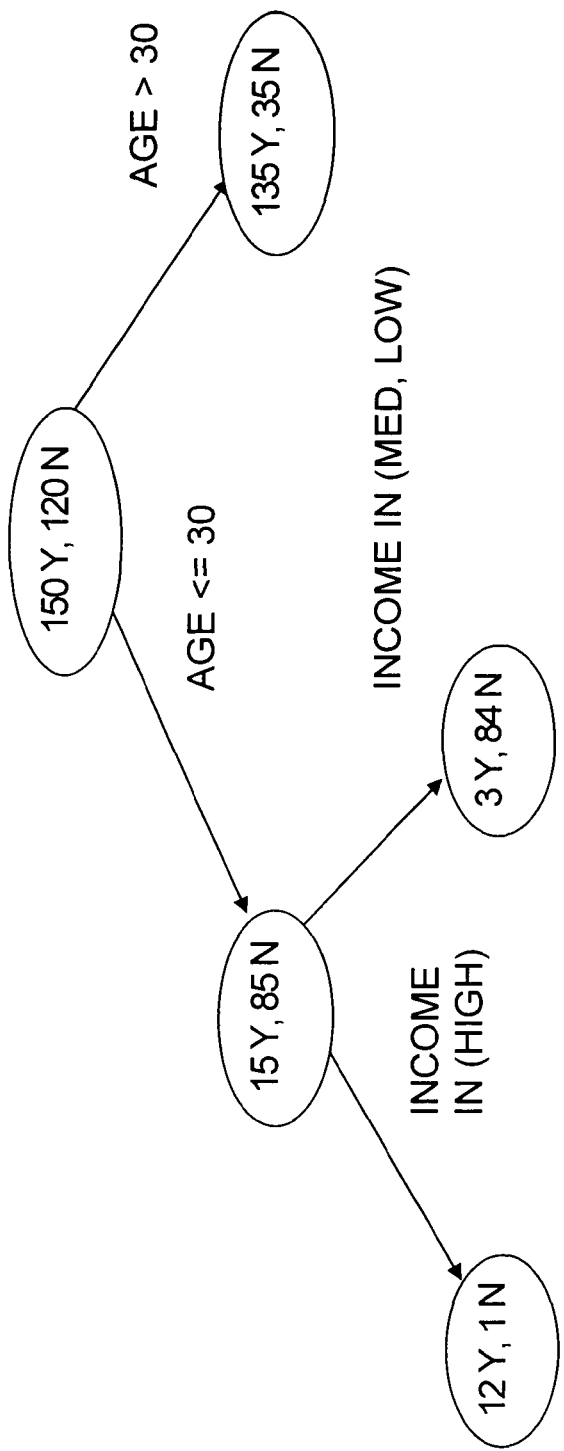
FIG. 1 illustrates an example of the application of a decision tree model.

An example of the application of a decision tree model is shown in FIG. 1. In this example, the decision tree models the response to a credit card promotion and may be used to provide a prediction as to the answer to the question "Will a customer respond to a credit card promotion?" In order to obtain the prediction, information relating to the particular customer may be used to traverse the tree by, at each node of the tree, using values of the customer's information to select a branch of the tree to follow. For example, the root of the tree, with no information about the customer, the prediction is that the customer is 56% (150 Y, 120 N) likely to respond to the promotion. If the customer's age is known, then if the age is greater than 30, the prediction is that the customer is 75% (135 Y, 35 N) likely to respond to the promotion. If the age is less than or equal to 30, the prediction is that the customer is 15% (15 Y, 85 N) likely to respond to the promotion. If the customer's income is also known, then the prediction can be further refined. If the customer's income is medium or low, then the prediction is that the customer is 3% (3 Y, 84 N) likely to respond to the promotion. If the customer's income is high, then the prediction is that the customer is 92% (12 Y, 1 N) likely to respond to the promotion. Thus, although it may not be worthwhile to target the credit card promotion to people under the age of 30 in general; targeting the promotion to people under the age of 30 with high incomes is worthwhile.

The present invention is particularly concerned with the generation of a decision tree model, such as that shown in FIG. 1. The present invention implements the functionality of generating a decision tree model in a database system. Preferably, the majority of the functionality is implemented via an internal SQL table function leveraging parallel recursion and bitmap indexes.

Figure 2:
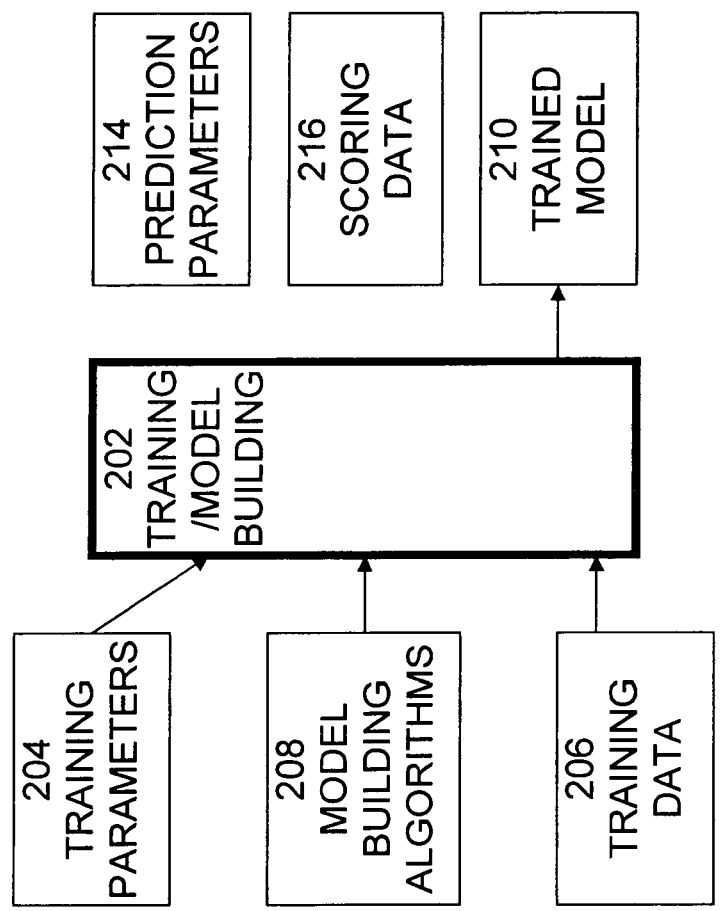
FIG. 2 is an exemplary data flow diagram of a process of building a decision tree model.

An exemplary data flow diagram of a process 200 of building a decision tree model, including building and scoring of models and generation of predictions/recommendations, is shown in FIG. 2. The training/model building step 202 involves generating the decision tree models that may be used to perform data mining recommendation and prediction. The inputs to training/model building step 202 include training parameters 204, training data 206, and model building algorithms 208. Model building algorithms 208 include algorithms that process the training data 206 in order to actually build the models. In particular, model building algorithms 208 includes decision tree algorithms that are used to build data mining models that are based on decision trees. Training parameters 204 are parameters that are input to the data-mining model building algorithms to control how the algorithms build the models. Training data 206 is data that is input to the algorithms and which is used to actually build the models.

Training/model building step 202 invokes the data mining model building algorithms included in model building algorithms 208, initializes the algorithms using the training parameters 204, processes training data 206 using the algorithms to build the model, and generates trained model 210. Trained model 210 includes representations of the decision tree model. Trained model 210 may also be evaluated and adjusted in order to improve the quality, i.e. prediction accuracy, of the model. Trained model 210 is then encoded in an appropriate format and deployed for use in making predictions or recommendations.

In the present invention, the bulk of the model building algorithms 208 are implemented in the form of a new decision tree table function. The input to this function is training data 206 in the form of a set of rows containing predictors (like age, gender, etc.) and a categorical target (perhaps income_level). Each row contains all of the information for a particular case. In addition, the table function has other inputs, such as training parameters 204, to help guide the tree build process (e.g., maximum tree depth).

Figure 3:
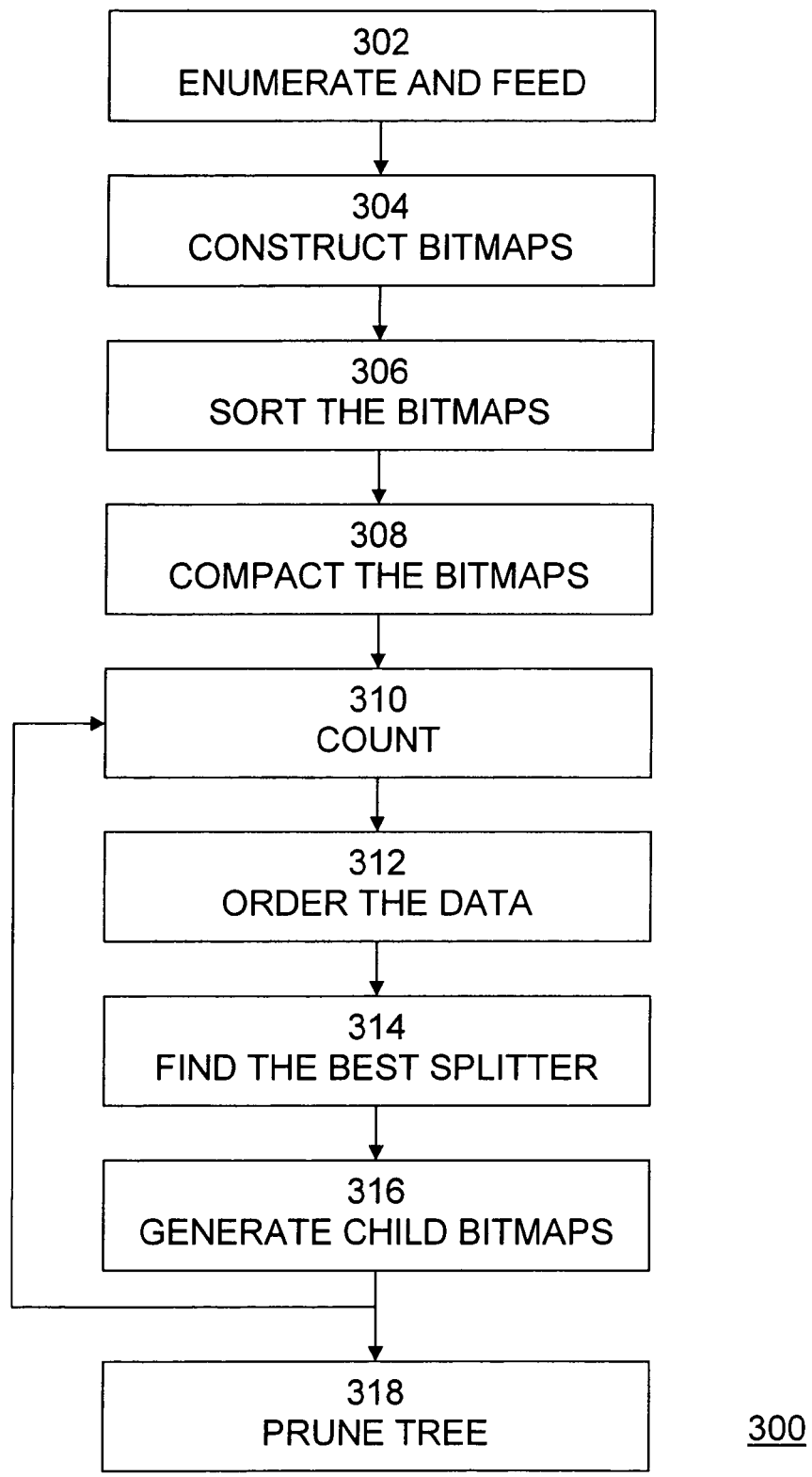
FIG. 3 is an exemplary flow diagram of a process of in-database building of a decision tree model.

A process 300 of in-database building of a decision tree model, such as that performed in step 202 of FIG. 2, is shown in FIG. 3. Process 300 begins with step 302, enumerate and feed, in which data is taken from normal rows in database tables and prepared for bitmap construction.

In step 304, the bitmaps are constructed. In order to construct the bitmaps, the incoming rows of data are numbered, then a bitmap is constructed for each unique value of each predictor and target that indicates whether or not that unique value of each predictor and target is present in that row. An example of this is shown in FIG. 4. As shown in FIG. 4, a plurality of rows 401-409, etc., include a plurality of values of predictors, such as age and income, as well as one or more targets, such as their response to a promotion. A bitmap 450 is constructed for age 1 that indicates whether or not the value 1 of the predictor age is present in each row 401-409, etc. Likewise, bitmaps 451-454 are constructed for other ages, and indicate whether or not their value of the predictor age is present in each row 401-409, etc. In addition, bitmaps for other predictors, such as income, etc., and for the targets, such as response, are constructed.

In step 306, the bitmaps are sorted by predictor and predictor value and target and target value, which may improve performance of the decision tree generation process. In step 308, the sorted bitmaps are compacted, which also may improve performance of the decision tree generation process.

In step 310, once the compacted bitmaps are available, the counts of predictor-target pairs are generated. Preferably, this is done by intersecting a predictor bitmap with a target bitmap and counting the number of resulting intersections. For example, the number of males with low income can be counted by intersecting the bitmaps for (gender, m) and (income_level, low) and counting the resulting intersections—rows where both the predictor value and target value are present.

In step 312 the resulting training data is ordered. Preferably, the ordering depends upon the type of data being processed. For example, for numerical data, the data is preferably ordered by predictor value, while for categorical data, the data is preferably ordered by target density.

In step 314, the counts generated in step 310 are used to determine, initially, for the root node, which predictor is the best splitter and where the split should occur. The splitting process of step 314 takes the raw predictor-target counts (per node) and computes the best split, preferably using an impurity metric, such as the Gini impurity metric or the entropy impurity metric. For example, the Gini impurity metric may be defined as:

a. $1-SUM(p(j|t)^2)$ over all target classes j,
b. $p(j|t)=p(j,t)/p(t)=p(j,t)/SUM(p(j,t))$,
c. $p(j,t)=P(j)*Nj(t)/Nj$, where $P(j)$ is the (altered) prior probability of class j, $Nj(t)$ is the number of records of class j in node t, and $Nj$ is the number of records of class j in whole training set.

It is to be noted that splitting considerations vary with the type of data to be split. For example, for Numerical predictors, possible split points are along predictor value order (range splits). For categorical predictors with binary targets, possible split points lie along sorted order of target density (class1cnt/(class1cnt+class2cnt)). For categorical predictors with multi-class targets, it is preferable to use "twoing", that is, to arbitrarily group target classes into two "super" classes, use the regular approach for categoricals as above, and reassign targets to groups based on node dominance and repeat.

In step 316, the bitmaps for each child node generated by the split are generated. Once the best split is determined in step 314, the split information is fed to step 316, so that the node bitmaps for the next level can be generated. In addition, the best split information is sent to the pruning step 318 for further processing. The splitting step may also generate surrogate splits and target histograms, if desired.

Process 300 then loops back to step 310 in order to recursively perform steps 310-314 on each child node of the tree as the tree is split. The tree is built in a breadth-first manner. First, the root split is determined. Once this is done, the root's two child node bitmaps are generated and the best splits for those two children are determined. Once this is done, the process moves to the third level, and so on.

It is to be noted that step 312 is among the steps that are repeated. As described above, the ordering performed by this step depends upon the type of data being processed. For example, for numerical data, the data is preferably ordered by predictor value, while for categorical data, the data is preferably ordered by target density. When the process sees a predictor name change, the data is retrieved in the ordered fashion and each possible split point is evaluated using an impurity metric. The best split point determined this way is preserved and compared to the previous best predictor split. When the process has finished with a set of nodes, it returns the best splits found.

In step 318 the tree is pruned by walking the decision tree and using a Minimum Description Length (MDL) based pruning approach to trim off leaves and branches. The pruned tree is then output from process 300. The main purpose of pruning is to take the built tree and prune so that it is general (not over-trained). In addition, during the pruning phase nodes are renumbered so that branch nodes start with 0 and are contiguous and extra splits and surrogates are eliminated.

Pruning processing includes:
Checking for row type based on encoding
Putting binning information in a hash table
Discarding extraneous splits (main and surrogate)
Storing split and node cost information in a costs tree
Taking the costs tree and walking it recursively
Comparing node depth to a pre-defined maximum value
Comparing the cost of representing the node split including both child target histograms, encoding the split information (predictor and split values), +1 for node structure to the parent target histogram
If not pruned away, output the row (exploding to cover all bins for categorical binning)

In order to produce a split for a given predictor of a given node and provide a measure of "goodness" for the split, it is preferred that a single process have all of the predictor-target counts for that predictor for that node. This is not strictly necessary, but reduces implementation complexity significantly.

An exemplary interface defining an SQL statement that invokes in-database generation of a decision tree model is shown in FIG. 5. The SQL statement defined by this interface is labeled ORA_FI_DECISION_TREE_HORIZ. An example of the use of this statement in SQL code is shown in FIG. 6. Typically, users would invoke the SQL code shown in FIG. 6 through a PL/SQL API, an example of which is shown in FIG. 7.

Preferably, the representation of a decision tree is encoded in tabular format, as this is the natural form of input/output for relational processing. This encoding combines a number of structurally distinct inputs and places them all within a single schema. The preferred schema for this implementation contains the following columns:

PARENTNODE NUMBER: the parent's node number
NODE NUMBER: the node number
SPLITNUM: the split number (distinguishing main from surrogate, etc.)
SPLITVAL_SUPP: the goodness of the split, also the node support
ATTRNAME: the name of the splitting attribute
LOVAL: low value for numerical splits (<=loval)
HIVAL_SUPP: high value for numerical splits (>hival)
ATTRVAL_TGTVAL: the categorical attribute value, also the target class To encode a class total row (node target histogram), SPLITNUM is set to null. Once this happens, NODE NUMBER identifies the node for this class total, ATTVAL_TGTVAL holds a target value, and HIVAL_SUPP holds the number of occurrences of that target. If there are three distinct classes in that node, then there will be three rows with that specified NODE NUMBER and SPLITNUM set to null.

To encode a main split, SPLITNUM is set to 0. The other columns are then used to identify the split itself. NODE NUMBER and PARENTNODE NUMBER indicate the location in the tree (the edge). ATTRNAME indicates the splitting predictor. For numerical splitters, LOVAL and HIVAL indicate the split point, and a single row identifies the entire split. For categorical splitters, ATTRVAL_TGTVAL holds a single categorical value, and there is one row per category to represent the entire categorical in-list. SPLITVAL_SUPP holds information concerning the quality of the split.

Surrogate splits are encoded in an identical fashion to the main split, with the exception that the SPLITNUM column is an integer greater than 0. The surrogate with SPLITNUM of 1 is the primary surrogate, the surrogate with SPLITNUM of 2 is the secondary one (only necessary if the primary is not usable), etc.

In addition to the main rows defining a tree, some special rows that are necessary for internal processing are also encoded.

The split predictor cardinality (needed for cost-sensitive pruning) is encoded by setting SPLITNUM<0. The binning information, which is global for the entire tree, is encoded by setting NODE NUMBER and PARENTNODE NUMBER to null. The predictor counts (needed for cost-sensitive pruning) are encoded by setting NODE NUMBER, PARENTNODE NUMBER, and SPLITNUM to 0. Finally, the target class cardinality (needed for cost-sensitive pruning) is encoded by setting NODE NUMBER and PARENTNODE NUMBER to 0 and SPLITNUM to a value other than 0.

Figure 8:
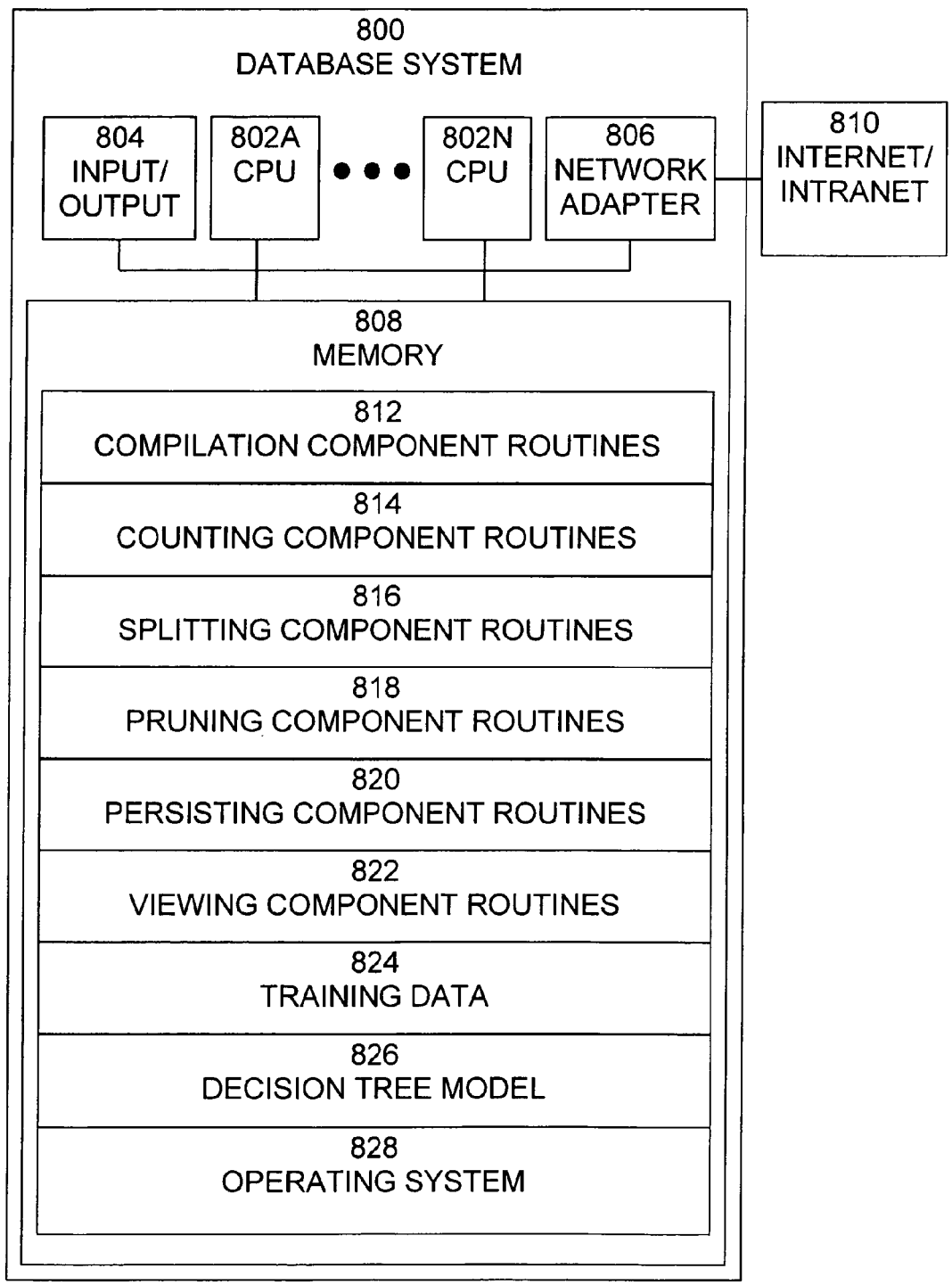
FIG. 8 is an exemplary block diagram of a database system, in which the present invention may be implemented.

An exemplary block diagram of a database system 800, in which the present invention may be implemented, is shown in FIG. 8. Database system 800 is typically a programmed general-purpose computer system, such as a personal computer, workstation, server system, and minicomputer or mainframe computer. Database system 800 includes one or more processors (CPUs) 802A-802N, input/output circuitry 804, network adapter 806, and memory 808. CPUs 802A-802N execute program instructions in order to carry out the functions of the present invention. Typically, CPUs 802A-802N are one or more microprocessors, such as an INTEL PENTIUM® processor. FIG. 8 illustrates an embodiment in which database system 800 is implemented as a single multi-processor computer system, in which multiple processors 802A-802N share system resources, such as memory 808, input/output circuitry 804, and network adapter 806. However, the present invention also contemplates embodiments in which database system 800 is implemented as a plurality of networked computer systems, which may be single-processor computer systems, multi-processor computer systems, or a mix thereof.

Input/output circuitry 804 provides the capability to input data to, or output data from, database system 800. For example, input/output circuitry may include input devices, such as keyboards, mice, touchpads, trackballs, scanners, etc., output devices, such as video adapters, monitors, printers, etc., and input/output devices, such as, modems, etc. Network adapter 806 interfaces database system 800 with Internet/intranet 810. Internet/intranet 810 may include one or more standard local area network (LAN) or wide area network (WAN), such as Ethernet, Token Ring, the Internet, or a private or proprietary LAN/WAN.

Memory 808 stores program instructions that are executed by, and data that are used and processed by, CPU 802 to perform the functions of database system 800. Memory 808 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof; such as fast-SCSI, wide-SCSI, fast and wide-SCSI, etc, or a fiber channel-arbitrated loop (FC-AL) interface.

In the example shown in FIG. 8, memory 808 includes compilation component routines 812, counting component routines 814, splitting component routines 816, pruning component routines 818, persisting component routines 820, viewing component routines 822, training data 824, decision tree model 826, and operating system 828. Compilation component routines 812 compile the SQL table function and perform the enumerate and feed functions, in which data is taken from normal rows in database tables and prepared for bitmap construction by building a row source tree. Counting component routines 814 generate the bitmaps (predictor, target, and node), intersect the bitmaps, and count the results. Splitting component routines 816 find the best split and surrogates for each node. Pruning component routines 818 prune the resulting tree. Persisting component routines take the output of the table function and produce a data mining model, decision tree model 826, and model tables to hold this information. Viewing component routines 822 take a built model and return its details. Training data 824 is data used by the routines to generate the decision tree model. Operating system 828 provides overall system functionality.

As shown in FIG. 8, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method, comprising steps of:
a database management system computing a database language statement that includes a reference that references a table function defined by an interface definition, the reference specifying, according to the interface definition, a dataset and a data mining model to be created from the dataset;
wherein said interface definition defines a schema for rows returned by said table function, said schema comprising columns;
wherein said database management system computing the database language statement comprises said database management system computing the table function, wherein said database management system computing the table function comprises the table function generating particular rows that represent the data mining model, wherein said particular rows are generated to conform to the schema defined by the interface definition.

2. The method of claim 1, wherein the database language statement is a structured query language statement.

3. The method of claim 1, wherein the database management system is a Relational Database Management System.

4. The method of claim 3, wherein the data mining model is a decision tree data mining model.

5. A database management system comprising:
a processor operable to execute computer program instructions;
a memory operable to store computer program instructions executable by the processor; and
wherein said database management system is configured to perform:
computing a database language statement that includes a reference that references a table function defined by an interface definition, the reference specifying, according to the interface definition, a dataset and a data mining model to be created from the dataset;
wherein said interface definition defines a schema for rows returned by said table function, such schema comprising columns;
wherein said database management system computing the database language statement comprises said database management system computing the table function, wherein computing the table function comprises the table function generating particular rows that represent the data mining model, wherein said particular rows are generated to conform to the schema defined by the interface definition.

6. The database management system of claim 5, wherein the database language statement is a structured query language statement.

7. The database management system of claim 5, wherein the database management system is a Relational Database Management System.

8. The database management system of claim 5, wherein the data mining model is a decision tree data mining model.

9. A computer program product comprising:
a non-transitory computer readable storage medium; and
computer program instructions, recorded on the non-transitory computer readable storage medium, wherein execution by a one or more processors of the computer program instructions causes performance of:
a database management system computing a database language statement that includes a reference that references a table function defined by an interface definition, the reference specifying, according to the interface definition, a dataset and a data mining model to be created from the dataset;
wherein said interface definition defines a schema for rows returned by said table function, said schema comprising columns;
wherein said database management system computing the database language statement comprises said database management system computing the table function, wherein computing the table function comprises the table function generating particular rows that represent the data mining model, wherein said particular rows are generated to conform to the schema defined by the interface definition.

10. The computer program product of claim 9, wherein the database language statement is a structured query language statement.

11. The computer program product of claim 9, wherein the database management system is a Relational Database Management System.

12. The computer program product of claim 9, wherein the data mining model is a decision tree data mining model.

* * * * *